UNITED STATES PATENT OFFICE

ARTHUR Z. PEDERSEN, OF WEST ORANGE, NEW JERSEY, ASSIGNOR TO PEPLOID CORPORATION, OF NEW YORK, N. Y., A CORPORATION OF NEW YORK

POROUS ACID-RESISTING MATERIALS

No Drawing.     Application filed July 5, 1923. Serial No. 649,724.

My invention relates to the manufacture of porous, acid-resisting materials and, more particularly, to the manufacture of such materials for use in storage battery separators.

My invention is applicable to a large class of colloidal substances. I do not believe that any attempts have been made to endow such substances, with the exception of pyroxylin plastics, with the property of physical, as distinguished from mechanical, porosity; and in the case of pyroxylin plastics, to my knowledge, such attempts have not been successful. A method often tried is to mix a solution of celluloid with certain salts which are later washed out of the resulting product. It is almost an obvious comment that this method can not give a material suitable for storage battery separators, since the passage ways presumably left in the substance by the washed out salts are necessarily of dimensions which would permit solid particles of the same order of dimensions to penetrate the material, thus destroying the efficiency of the separators which soon become clogged. If the material is intended for use in filters, the noted objection is still more apparent. Besides, I found that it is practically impossible to entirely wash out the salts because the celluloid tends to surround the particles of the salts with an impervious film. This formation of an impervious film appears to be the stumbling block in almost all the attempted processes of the character here discussed. According to my discovery, no method of manufacturing porous celluloid can be successful unless two conditions are satisfied, of which the first is self-evident, namely:

I. If the porosity of the final product is to be such as to prevent the passage therethrough of particles of greater than colloidal size, the substance mixed with the celluloid and later washed out must be a colloid; and II. The solvents used in connection therewith, and the means for removing these solvents, must be such that no impervious film is formed on the surface or anywhere in the mass of the resulting substance upon the removal of the solvents.

In my method, both of the above conditions are satisfied.

My invention, broadly, is as follows:

I consider colloidal substances of two general classes: class A, comprising such substances as pyroxylin, rubber, natural and synthetic resins, celluloid and celluloid substitutes, and, in general, colloids characterized by their solubility in an organic solvent; and class B, comprising such substances as casein, sodium or potassium silicates, and, in general, colloids characterized by their solubility in water and having great affinity thereto. I shall denote by $a$ and $b$ respectively any solvent of A and B. Generally, the solvent $b$ is water. However, this restriction need not be made. The necessary condition, as regards the solvents, in the practice of my invention, is that $a$ must not be a solvent of B, nor $b$ a solvent of A.

Having made my selection of the substances A and B, together with their respective solvents, I mix a solution of A with a solution of B. I have found that this results in a mutual inter-action between the two solvents which causes similar reactions between the two materials in solution, namely, B will be precipitated in a finely divided form by the action of the solvent $a$, and, at the same time, A will be precipitated by the action of the solvent $b$, the finely divided particles of B permeating the precipitated mass of A. When the solvents begin to evaporate, I have found that the vapor will always contain a substantial proportion of the solvent $b$, and this proportion continually increases as evaporation proceeds, until, in the last stages of evaporation, the vapor is almost pure $b$ (water). As a result, since $b$ is antagonistic to A, at no stage is there any possibility of an impervious film of A forming either on the surface, or anywhere in the mass, of the substance obtained, as in the case when the vapor is pure $a$, or at all times rich in $a$.

Thus, it will be seen that the conditions which I have found to be necessary for making porous celluloid are satisfied when the procedure just described is followed. The impervious character of the colloid A having been destroyed by the colloid B, the resulting substance will be porous, and the pores will be of colloidal dimensions. Before the particles of B are washed out of the product, they act as a binder for the particles of A, drawing them continually together, as shrinkage takes place, until the mass finally and permanently sets. The particles of B gradually separate from those of A during the process of shrinking and, having great affinity for the solvent $b$ (water), are easily washed out by means of this solvent.

Having described my invention in its broad aspects, I will now give an illustration in the specific case where the colloid selected from class A is a cellulose nitrate, the solvent $a$ is acetone, the colloid selected from class B is sodium silicate, and the solvent $b$ is water. The proportions in this illustration are as follows:

Fifty grams of cellulose nitrate, treated with seven and one half ounces of acetone until dissolved. The quantity of sodium silicate used is eighty cubic centimeters. After mixing thoroughly, add a little acetone to make the mass more plastic.

After being pressed into a sheet, the mass is left to harden in the air. It is then placed in water which is changed several times, until all of the sodium silicate is washed out. After drying, the sheet shows no surface skin and a porosity of about fifty percent, i. e. when soaked in water it weighs about twice what it weighs when dry.

The porosity of the product as obtained by my process may be varied and is controllable both as regards the number of pores and their size. The greater the proportion of B mixed with A, the greater will be the number of pores. The size of the pores may be controlled by the rate of evaporation. The evaporation depends on several factors, such as the thickness of the material, the character of the solvents, or the humidity of the atmosphere. I have found that the pores are larger or smaller in size according as the humidity is higher or lower. As to the effect of the thickness of the material, naturally, the thicker it is the slower will be the rate of evaporation. As I may make the material of any thickness I desire, sawing or cutting it later to suit my purposes, into sheets of any desired thickness, I may control the porosity of the sheets in this manner. Of course, the nature of the colloids selected will, also, affect the porosity of the product. For instance, various elements of the class B, when precipitated in accordance with my method, will be divided into more or less fine particles, and the ultimate porosity of the substance will dictate which one of the elements of the class B is best suited for any particular purpose. Thus, when the material is to be used for filtering purposes, an element of B should be selected which precipitates in particularly finely divided particles, the proportion of B to A should be determined in accordance with the amount of impurities contained in the liquid which is to be filtered, and the atmosphere should be of low humidity so as to give exceptionally fine pores, because, in filtering, it may be necessary to prevent the passage of even colloidal matter of more than ultro-microscopic dimensions. On the other hand, when the material is to be used for storage battery separators, the above enumerated factors which control the number and size of the pores must be so selected as to prevent the clogging of the separators by particles of a comparatively larger size only, permitting, therefore, the pores to be of greater size than in the case of filters. For such use, I have found sodium silicate excellently well suited among the members of class B, and, when combined with cellulose nitrate, for instance, among the members of Class A, yielding very satisfactory results, as illustrated in the example given above.

My method, further, offers excellent means for meeting a great variety of other conditions that may be imposed on the material to be used. For instance, it may be desired that the material be particularly resistant to a certain acid. This condition is met by selecting among the members of the class A the one which most resists the action of this particular acid. Or, the condition imposed may be that the material be non-inflammable. Accordingly, I select from among the members of A the one meeting this condition, as for instance, a cellulose acetate, or one of the many synthetic resins possessing the desired property. Again, the condition imposed may relate to the mechanical strength of the substance. The suitable members among A will be selected without difficulty, the physical and chemical properties of all the members of the group being known in the art.

In the above given example, the porous substance was intended for use as a storage battery separator. Sodium silicate, selected as the member of class B, offers especial advantages in this connection. It meets all of the conditions which are necessary in the practice of my invention. It has a very great affinity for water. It acts as an excellent binder for the mass during the shrinking process. Even should some of it remain in the substance when actually used in a battery, it does not interfere with the efficiency of the separator or battery since, when attacked by sulfuric acid, it precipitates silica ($SiO_2$), a finely divided powder. As for the member A, I find that it makes no noticeable difference whether I use cellulose nitrate or commercial celluloid, so that I may proceed either by following the well known steps in the manufacture of celluloid, up to the stage where my treatment is applied to the material, or make use of the prepared, commercial celluloid.

The appearance of the product, when free from pigments, in form of a thin sheet, suitable for use as a storage separator, is that of grayish white blotting paper. It has none of the horny, glossy character of ordinary celluloid. It has sufficient mechanical strength for the intended use and, of course, all of the acid-resisting quality of celluloid. Preferably, the sheet is ribbed, but the porosity of the material is such that it will exercise its function even when it is ribless and in continuous contact with the battery plates. Among its many advantages, as compared with wood separators, are controllable porosity, lower internal resistance, greater resistance to acid, greater pliability, more uniform mechanical strength, reduced danger of short circuiting, a negligible expansion when immersed in a liquid (I found a standard wood separator to expand about 10% in the direction at right angles to that of the ribs when immersed in water), and many other features apparent from the nature of the material; while it shares with the wood separator the advantages of cheapness, light weight and small bulk.

In order to make my invention easier to understand, I have, in what was said hereinbefore, only mentioned mixtures of two colloids, one of the class A, and one of the class B. But my invention is not limited to such mixtures. Clearly, I may mix a solution of a colloid A with more than one peptized member of the class B. In such an application of my process, the only practical difference from that in which a single member B was used is that the particles of more than one colloid B will have to be washed out of the resulting substance. The advantage of using more than one member B in some instances may be seen from the following consideration. If the pores created in the substance A by using a single member B' of the class B are of certain colloidal dimensions D' which are, let us say, very small, and the pores created in the same colloid A by using another member of the class B, denoted by B'', in the application of my process, are of colloidal dimensions D'' which are comparatively large, and it is desired to produce a porous substance having pores greater than D', but smaller than D'', I mix a solution of A with solutions of B' and B'', otherwise following my method as before.

Other variations and modifications of my invention, additions thereto, omissions therefrom, or substitutions therein, may be made by those skilled in the art without departing from the essence and spirit of my invention.

I claim:

1. The process of making a porous acid-resisting material, which consists in mixing a peptized colloid characterized by its solubility in an organic solvent with a peptized colloid characterized by its solubility in water, thereby causing a precipitate to form, and removing the solvents and the colloid soluble in water from said precipitate.

2. The process of making a material having pores of colloidal dimensions, which consists in mixing a peptized colloid characterized by its solubility in an organic solvent with peptized colloids characterized by their solubility in water, thereby causing a precipitate to form, and removing the solvents and the colloids soluble in water from said precipitate.

3. The process of imparting porosity to a colloid characterized by its solubility in an organic solvent, wherein a solution of said colloid is mixed with a peptized colloid characterized by its solubility in water, thereby causing a precipitate to form, and removing the solvents and the colloids soluble in water from said precipitate.

4. The process of making a porous material by mixing two colloids in solution, one colloid being characterized by its solubility in an organic solvent, and the second colloid by its solubility in water, thereby causing a precipitate to form, evaporating the solvents from said precipitate until it hardens, and washing the particles of said second colloid out of said precipitate.

5. The process of making a porous acid-resisting material by mixing peptized colloids, one of which is characterized by its solubility in an organic solvent, while the other colloids are characterized by their solubility in water, thereby causing a precipitate to form, permitting said precipitate to harden in the air, and washing out therefrom said other, water soluble, colloids.

6. The process of making an acid resisting material having pores of colloidal dimensions by mixing peptized colloids, one of which is characterized by its solubility in an organic solvent, while the other colloids are characterized by their solubility in water, thereby causing a precipitate to form, evaporating the solvents from said precipitate, washing said other colloids out of said precipitate, and allowing the resulting substance to dry.

7. The process of making a porous pyroxylin plastic by mixing dissolved pyroxylin and a peptized colloid characterized by its solubility in water, thereby causing a precipitate to form, evaporating the solvents from said precipitate, washing the particles of said colloid out of said precipitate, and allowing the resulting substance to dry.

8. The process of making a porous pyroxylin plastic by mixing dissolved pyroxylin and a solution of sodium silicate, thereby causing a precipitate to form, evaporating said precipitate until it hardens, washing the particles of sodium silicate out of said precipitate, and allowing the resulting substance to dry in the air.

9. The process of making an acid-resisting, porous material, in sheet form, by mixing peptized colloids, one of which is characterized by its solubility in an organic solvent and the others by their solubility in water, thereby causing a precipitate to form, pressing said precipitate into a sheet, removing the solvents therefrom by evaporation, washing the particles of said other, water soluble, colloids out of said sheet, and drying said sheet in the air.

10. The process of making a porous colloidal substance in sheet form, by mixing a colloid dissolved in an organic solvent with a solution of sodium silicate, thereby causing a precipitate to form, pressing said precipitate into a sheet, removing therefrom the solvents, washing the sodium silicate out of said sheet, and allowing said sheet to dry.

11. The process of making a porous, acid-resisting material in sheet form, by mixing dissolved pyroxylin and a solution of sodium silicate, thereby causing a precipitate to form, pressing said precipitate into a sheet, removing therefrom the solvents, washing the particles of sodium silicate out of said sheet, and allowing said sheet to dry in the air.

12. The process of making a porous, acid-resisting diaphragm for use as a storage battery separator, by mixing pyroxylin and sodium silicate dissolved in an organic solvent and in water respectively, thereby causing a precipitate to form, shaping said precipitate into a form suitable for the aforesaid diaphragms, allowing the solvents to evaporate therefrom until the mass hardens, washing the sodium silicate out of the hardened mass, and allowing the resulting substance to dry.

13. The process for making a porous, acid-resisting material, by mixing a peptized colloid soluble in an organic solvent with a peptized colloid soluble in water in proportion to the degree of porosity of said material, causing a precipitate to form, and removing the particles of said colloid soluble in water from said precipitate.

14. The process for making a porous colloidal substance by mixing a peptized colloid soluble in an organic solvent with peptized colloids soluble in water in proportion to the degree of porosity of said substance, causing a precipitate to form, and removing said colloids soluble in water from said precipitate.

15. The process of making a material having pores of colloidal dimensions, wherein peptized colloids characterized, as to one of them, by solubility in an organic solvent, and as to others, by solubility in water, are mixed, thereby causing a precipitate to form, and wherein the size of said pores is regulated by controlling the evaporation of solvents from said precipitate.

16. The process of making a porous colloidal material, wherein peptized colloids characterized, as to one of them, by its solubility in an organic solvent, and, as to the others, by their solubility in water, are mixed, thereby causing a precipitate to form, removing said colloids soluble in water and evaporating said solvents from said precipitate, and regulating the porosity of said material by controlling the proportions of said peptized colloids and the rate of evaporation of the solvents from said precipitate.

17. A substance comprising the precipitate of a mixture of two peptized colloids of which one is characterized by its solubility in an organic solvent and the other by its solubility in water.

18. A material comprising the solvent-free precipitate from a mixture of peptized colloids, of which one is characterized by its solubility in an organic solvent, and the others by their solubility in water.

19. An acid-resisting material comprising a solvent-free precipitate of a mixture of peptized colloids, of which one is soluble in an organic solvent, and the others are soluble in water.

20. An acid-resisting substance comprising a hardened precipitate of a mixture of peptized colloids, of which one is characterized by its solubility in an organic solvent, and the others by their solubility in water, the pores of said precipitate being of colloidal dimensions.

21. An acid-resisting material consisting of a compressed mass of a solvent-free precipitate of a mixture of colloids in solution, one of said colloids being characterized by its solubility in an organic solvent, and the other colloids by their solubility in water.

22. A substance comprising the precipitate of a mixture of dissolved pyroxylin with a peptized colloid soluble in water.

23. A substance comprising a solvent free precipitate of a peptized colloid, soluble in an organic solvent, mixed with a solution of sodium silicate.

24. An acid-resisting material comprising a solvent-free precipitate of a mixture of dissolved pyroxylin and a solution of sodium silicate.

25. An acid resisting material consisting of a compressed mass of a solvent-free precipitate obtained from a mixture of dissolved pyroxylin and peptized sodium silicate.

26. The process of making a porous acid-resisting material by mixing peptized colloids, one of which is characterized by its solubility in an organic solvent and the others by their solubility in water, thereby causing a precipitate to form, removing the solvents and said other, water soluble, colloids from said precipitate, allowing the resulting substance to harden, and dividing said hardened substance into parts of suitable shape and size.

27. The process of making a porous pyroxylin plastic by mixing dissolved pyroxylin and a peptized colloid soluble in water, thereby causing a precipitate to form, evaporating said precipitate until it hardens, dividing the hardened substance into sheets of suitable size and thickness, and removing said colloid soluble in water from said sheets.

28. The process of making a porous material by mixing two peptized colloids of which one is characterized by its solubility in an organic solvent and the second colloid by its solubility in water, thereby causing a precipitate to form, removing the solvents from said precipitate, allowing the mass to harden, dividing the hardened mass into sheets or other suitable shapes, and removing said second colloid from said sheets or shapes.

ARTHUR Z. PEDERSEN.